US009840393B2

(12) United States Patent
Kang et al.

(10) Patent No.: US 9,840,393 B2
(45) Date of Patent: Dec. 12, 2017

(54) DRIVE WHEEL SET, WIRE STORAGE FRAME, GUIDE WHEEL FRAME, TRACTION MECHANISM AND CONVEYING MECHANISM

(71) Applicants: SHENZHEN WOER HEAT-SHRINKABLE MATERIAL CO., LTD, Shenzhen, Guangdong (CN); SHENZHEN WOER SPECIAL WIRE&CABLE CO., LTD, Shenzhen, Guangdong (CN); CHANGZHOU WOER HEAT-SHRINKABLE MATERIAL CO., LTD, Changzhou, Jiangsu (CN); LTK ELECTRIC WIRE (HUIZHOU) LTD, Huizhou, Guangdong (CN); HUIZHOU LTK ELECTRONIC CABLE LTD, Huizhou, Guangdong (CN)

(72) Inventors: Shufeng Kang, Guangdong (CN); Heping Zhou, Guangdong (CN); Jiawei Wang, Guangdong (CN); Weiguo Li, Guangdong (CN); Zengguo Zhang, Guangdong (CN)

(73) Assignees: SHENZHEN WOER HEAT-SHRINKABLE MATERIAL CO., LTD, Shenzhen, Guangdong (CN); SHENZHEN WOER SPECIAL WIRE & CABLE CO., LTD, Shenzhen, Guangdong (CN); CHANGZHOU WOER HEAT-SHRINKABLE MATERIAL CO., LTD, Changzhou, Jiangsu (CN); LTK ELECTRIC WIRE (HUIZHOU) LTD, Huizhou, Guangdong (CN); HUIZHOU LTK ELECTRONIC CABLE LTD, Huizhou, Guangdong (CN)

( * ) Notice: Subject to any disclaimer, the term of this patent is extended or adjusted under 35 U.S.C. 154(b) by 0 days.

(21) Appl. No.: 15/198,573

(22) Filed: Jun. 30, 2016

(65) Prior Publication Data
US 2016/0355369 A1   Dec. 8, 2016

Related U.S. Application Data

(63) Continuation of application No. PCT/CN2013/091222, filed on Dec. 31, 2013.

(51) Int. Cl.
*B65G 23/04* (2006.01)
*B65G 23/08* (2006.01)
(Continued)

(52) U.S. Cl.
CPC ............. *B65H 51/32* (2013.01); *B65G 15/50* (2013.01); *B65G 23/08* (2013.01); *B65H 51/06* (2013.01);
(Continued)

(58) Field of Classification Search
CPC ........ B65G 15/14; B65G 15/20; B65G 23/23; B65G 43/08; B65H 57/14; B65H 51/20;
(Continued)

(56) References Cited

U.S. PATENT DOCUMENTS

| 3,747,863 | A  | * | 7/1973 | Klementz | ............... | D02J 1/225 |
| | | | | | | 242/364.11 |
| 7,282,826 | B2 | * | 10/2007 | Langenberg | ............ | E21C 29/16 |
| | | | | | | 198/832 |
| 8,757,364 | B2 | * | 6/2014 | Obst | ...................... | B65G 13/02 |
| | | | | | | 193/37 |

FOREIGN PATENT DOCUMENTS

| CN | 201825592 | 5/2011 |
| CN | 102336348 | 2/2012 |

(Continued)

OTHER PUBLICATIONS

International Search Report and Written Opinion, issued in the corresponding PCT application No. PCT/CN2013/091222, dated Sep. 29, 2014, 21 pages.

*Primary Examiner* — James R Bidwell
(74) *Attorney, Agent, or Firm* — Hamre, Schumann, Mueller & Larson, P.C.

(57) ABSTRACT

Disclosed is a drive wheel set, comprising a common shaft and at least two external rotor motors installed on the
(Continued)

common shaft. External rotors of the external rotor motors form drive wheels of the drive wheel set. Also disclosed are a vertical-type wire storage frame, a swing-type wire storage frame, a guide wheel frame, a traction mechanism and a multi-path conveying mechanism using the drive wheel set. The drive wheel set is small in size, occupies less space, and is suitable for a situation where a plurality of motors need to be driven but sufficient space is lacking.

18 Claims, 6 Drawing Sheets

(51) Int. Cl.

| | | |
|---|---|---|
| *B65H 51/08* | (2006.01) | |
| *B65H 51/32* | (2006.01) | |
| *B65H 51/20* | (2006.01) | |
| *H02K 21/22* | (2006.01) | |
| *H02K 7/14* | (2006.01) | |
| *H02K 16/00* | (2006.01) | |
| *B65H 51/12* | (2006.01) | |
| *B65G 15/50* | (2006.01) | |
| *B65H 51/06* | (2006.01) | |
| *B65H 51/14* | (2006.01) | |
| *B65H 57/14* | (2006.01) | |
| *H02K 7/10* | (2006.01) | |

(52) U.S. Cl.
CPC .............. *B65H 51/08* (2013.01); *B65H 51/12* (2013.01); *B65H 51/14* (2013.01); *B65H 51/20* (2013.01); *B65H 57/14* (2013.01); *H02K 7/1016* (2013.01); *H02K 7/14* (2013.01); *H02K 16/00* (2013.01); *H02K 21/22* (2013.01); *B65H 2701/36* (2013.01)

(58) Field of Classification Search
CPC ........ B65H 51/04; B65H 51/06; B65H 51/08; B65H 51/32
USPC .......................... 198/832, 835, 805, 788, 789
See application file for complete search history.

(56) References Cited

FOREIGN PATENT DOCUMENTS

| | | | |
|---|---|---|---|
| CN | 102624148 | 8/2012 | |
| CN | 203048298 | 7/2013 | |
| CN | 103701261 | 4/2014 | |
| CN | 203699152 | 7/2014 | |
| CN | 203699153 | 7/2014 | |
| CN | 203699538 | 7/2014 | |
| CN | 203699541 | 7/2014 | |
| CN | 203699555 | 7/2014 | |
| FR | 2870837 | * 12/2005 | ............ B65H 51/12 |
| GB | 205162 | 9/1970 | |

* cited by examiner

DRIVE WHEEL SET, WIRE STORAGE FRAME, GUIDE WHEEL FRAME, TRACTION MECHANISM AND CONVEYING MECHANISM

BACKGROUND

Technical Field

The present application relates to a drive wheel set and a vertical-type wire storage frame, a swing-type wire storage frame, a guide wheel frame, a traction mechanism and a multi-path conveying mechanism having the drive wheel set.

Related Arts

Drive Wheel Set

At present, operation of all kinds of machine equipment is mostly driven by motors. A plurality of motors are required when a plurality of machine equipment is driven, when the plurality of motors are in the same space especially used in parallel, each motor has a shaft, the plurality of motors have a plurality of shafts, and when the plurality of motors are used at the same time, a phenomenon exists that large space is occupied such that the plurality of motors cannot be placed in parallel. This is because, due to the volume of each motor plus a transmission manner of a belt or gear as well as limitations of the existing space, the motor cannot be placed in many places where an active motor should be modulated, and only driven wheels can be used or some functions of the equipment are lost, which may lead to product quality issues.

Vertical-Type Wire Storage Frame

During cable manufacturing, it is necessary to use a vertical-type wire storage frame, the vertical-type wire storage frame stores wires when a pay-off reel pays off, to be ready for the pay-off reel to change a reel, when the pay-off reel is empty and needs to change the reel, the vertical-type wire storage frame discharges wires, so as to avoid shut-down of production caused by reel changing of the pay-off reel, thus ensuring large-scale continuous production of the cables. Similarly, the vertical-type wire storage frame may also be used in a situation where a wire storage reel changes a reel, that is, the vertical-type wire storage frame discharges wires when the wire storage reel stores wires, and the vertical-type wire storage frame stores wires when the wire storage reel is full and changes the reel.

A traditional vertical-type wire storage frame includes a fixing portion, a cushion portion, a master wire wheel set, a master pivot, a slave wire wheel set and a slave pivot, the fixing portion is disposed vertically, one end of the master pivot is fixed onto the fixing portion, the cushion portion is fixed onto the fixing portion and located below the master pivot, one end of the slave pivot is fixed onto the cushion portion, the master pivot and the slave pivot are disposed in parallel, the master wire wheel set is installed on the master pivot, and the slave wire wheel set is installed on the slave pivot. When the vertical-type wire storage frame works, the cables are wound on wire wheels in the master wire wheel set and the slave wire wheel set, the cables drive at a fixed speed, the cables produce friction forces with master wire wheels and slave wire wheels, and the friction forces drive the master wire wheels and the slave wire wheels to rotate.

However, the wire storage capacity of the vertical-type wire storage frame is less, in order to increase the wire storage capacity of such an apparatus, people use a method of increasing the number of the master wire wheels in the master wire wheel set and the number of the slave wire wheels in the slave wire wheel set, as all the master wire wheels and slave wire wheels belong to idle wheels, only under the pulling force of the cables can they rotate, and to make more master wire wheels and slave wire wheels rotate, a greater cable pulling force is required; as the cables have elasticity, increase of the cable pulling force causes extension of the cables, and the diameter of the cables becomes thin, so that the cables after wire storage are not in line with the quality requirement; secondly, increase of the cable pulling force makes the pressure N of the cables on the wire wheels become great, a friction coefficient u between the cables and the wire wheels is unchanged, and according to a friction force calculation formula f=uN, the friction force between the cables and the wire wheels increases, which leads to wear-out and cutting of external insulation of the cables.

Chinese Patent Publication 102336348A discloses a vertical-type wire storage frame. The vertical-type wire storage frame is used to solve the problems of wear-out and cutting of external insulation of the cables; however, the master wire wheel set or the slave wire wheel set of the vertical-type wire storage frame has a problem of occupying a relatively large volume when using a drive speed regulating device in the form of a motor.

Swing-Type Wire Storage Frame

During manufacturing of cables or tubes, it is necessary to use a swing-type wire storage frame, the swing-type wire storage frame stores wires when a pay-off reel pays off, to be ready for the pay-off reel to change a reel, when the pay-off reel is empty and needs to change the reel, the swing-type wire storage frame discharges wires, so as to avoid shut-down of production caused by reel changing of the pay-off reel, thus ensuring large-scale continuous production of the cables. Similarly, the swing-type wire storage frame may also be used in a situation where a wire storage reel changes a reel, that is, the swing-type wire storage frame discharges wires when the wire storage reel stores wires, and the swing-type wire storage frame stores wires when the wire storage reel is full and changes the reel.

A traditional swing-type wire storage frame includes a fixing frame and a swing frame. The fixing frame is horizontally provided with a master wire wheel set. The swing frame is pivoted onto the fixing frame and pivoted below the master wire wheel set. One end of the swing frame is horizontally provided with a slave wire wheel set. When working, the swing-type wire storage frame drives the slave wire wheel set to swing through swing of the swing frame, thus achieving storage or release of wires or tubes, the wires or tubes are wound on wire wheels in the master wire wheel set and the slave wire wheel set, the wires or tubes drive at a fixed speed, the cables produce friction forces with master wire wheels and slave wire wheels, and the friction forces drive the master wire wheels and the slave wire wheels to rotate.

However, the wire storage capacity of the swing-type wire storage frame is less, in order to increase the wire storage capacity of such an apparatus, people use a method of increasing the number of the master wire wheels in the master wire wheel set and the number of the slave wire wheels in the slave wire wheel set, as all the master wire wheels and slave wire wheels belong to idle wheels, only under the pulling force of the cables can they rotate, and to make more master wire wheels and slave wire wheels rotate, a greater cable pulling force is required; as the cables have elasticity, increase of the cable pulling force causes extension of the cables, and the diameter of the cables becomes thin, so that the cables after wire storage are not in line with the quality requirement; secondly, increase of the cable pulling force makes the pressure N of the cables on the wire wheels become great, a friction coefficient u between the cables and the wire wheels is unchanged, and according to a friction force calculation formula f=uN, the friction force between the cables and the wire wheels increases, which leads to wear-out and cutting of external insulation of the cables.

Chinese Patent Publication 102336348A discloses a wire storage apparatus. The wire storage apparatus is used to solve the problems of wear-out and cutting of external insulation of the cables; however, the master wire wheel set or the slave wire wheel set of the wire storage apparatus has a problem of occupying a relatively large volume when using a drive speed regulating device in the form of a motor.

Guide Wheel Frame

During manufacturing of cables or tubes, it is necessary to use a guide wheel frame. The guide wheel frame includes a fixing frame and several arms fixed onto the fixing frame. Each arm is fixed with a wire wheel set.

When the guide wheel frame works, a guide function of the cables or tubes is achieved through the wire wheel set of the guide wheel frame; as the wire wheel set has several wire wheels, several cables or tubes in the same direction can be guided. The wires or tubes are respectively wound on several wire wheels of the wire wheel set to drive at a fixed speed.

However, rotation of the wire wheels of the wire wheel set is driven by a friction force of the cables or tubes, and the friction force leads to wear-out and cutting of external insulation of the cables or tubes.

Traction Mechanism

During a manufacturing process of tube wires such as wires, cables or heat-shrinkable tubes, it is necessary to use a traction mechanism to pull the tube wires.

The current traction mechanism includes two traction wheels oppositely disposed, each of which is driven by an internal rotor motor, has an incompact structure, and occupies great space.

Multi-Path Conveying Mechanism

During a manufacturing process of a product, it is necessary to use a conveying mechanism to convey the product.

The current conveying mechanism includes two traction wheels oppositely disposed, each of which is driven by an internal rotor motor, has an incompact structure, and occupies great space.

SUMMARY

An object of the present application is to provide a drive wheel set small in size and occupying less space.

Another object of the present application is to provide a vertical-type wire storage frame which is small in size, has large wire storage capacity and can ensure wire quality after wire storage.

Another object of the present application is to provide a swing-type wire storage frame which is small in size, has large wire storage capacity and can ensure wire quality after wire storage.

Another object of the present application is to provide a guide wire frame which is small in size and can avoid wear-out and cutting of external insulation of cables or tubes wound thereon.

Another object of the present application is to provide a traction mechanism compact in structure and occupying less space.

Another object of the present application is to provide a multi-path conveying mechanism compact in structure and occupying less space.

In one aspect, the present application provides a drive wheel set, including a common shaft and at least two external rotor motors installed on the common shaft, external rotors of the external rotor motors forming drive wheels of the drive wheel set.

Each of the external rotor motors includes a winding stator and an external rotor, the winding stator is fixed onto the common shaft, and the external rotor is disposed outside the winding stator and pivoted onto the common shaft.

Preferably, the external rotors are permanent magnetic external rotors.

Preferably, the winding stators of the external rotor motors and the common shaft are respectively provided with key slots and are fixed into the key slots through buckling keys to fix the winding stators onto the common shaft.

Preferably, the external rotors of the external rotor motors are pivoted onto the common shaft through bearings.

Preferably, the common shaft is provided with a wiring hole extending axially, wherein wire slots are disposed where the common shaft corresponds to the external rotor motors installed thereon, and wire harnesses of the drive wheels enter into the common shaft through the wire slots and are led out through the wiring hole.

Preferably, the external rotor motor is further provided with a cover body, the cover body and the external rotor are detachably fixed together, and the cover body is pivoted onto the common shaft through a bearing.

Preferably, the external rotor motors are squirrel-cage asynchronous motors.

As stated above, as at least two external rotor motors of the drive wheel set of the present application are disposed on the same common shaft, the distance between two adjacent external rotor motors can be minimized, which enables the drive wheel set to be small in size, occupy less space, and suitable for a situation where a plurality of motors need to be driven but sufficient space is lacking.

In another aspect, the present application provides a vertical-type wire storage frame, including a fixing frame and a master wire wheel set and a slave wire wheel set disposed on the fixing frame, the master wire wheel set and the slave wire wheel set being disposed in parallel, wherein at least one of the master wire wheel set and the slave wire wheel set is any drive wheel set described above.

As at least one of the master wire wheel set and the slave wire wheel set of the vertical-type wire storage frame of the present application is a drive wheel set, several external rotor motors of the drive wheel set are disposed on the same common shaft, the distance between two adjacent external rotor motors can be minimized, and the drive wheel set may be very small in size, which causes the vertical-type wire storage frame to be small in size and occupy less space.

The external rotor motors of the drive wheel set of the vertical-type wire storage frame of the present application are capable of self-driving, the linear speed of the external rotor motors can be equal to the speed of the tubes on the external rotor motors, and no friction force is produced therebetween any more, thus avoiding that the friction between the tubes and the external rotor motors produce wear-out and cutting of external insulation of the tubes and ensuring the quality of the tubes after wire storage.

As the external rotor motors are capable of self-driving, which is no longer provided by a pulling force of the tubes, the pulling force of the tubes decreases; certainly, it is also possible to adjust the external rotor motors as required to make a ratio between the linear speed of the external rotors and the speed of the cables wound on the external rotors decrease the friction force produced by them. Thus, in the vertical-type wire storage frame of the present application, more external rotor motors can be disposed on the drive wheel set, so as to store more tubes and ensure the quality of the stored tubes.

In another aspect, the present application provides a swing-type wire storage frame, including a fixing frame and a swing frame, the fixing frame being horizontally provided with a master wire wheel set, the swing frame being pivoted onto the fixing frame and pivoted below the master wire wheel set, and one end of the swing frame being horizontally provided with a slave wire wheel set, wherein at least one of the master wire wheel set and the slave wire wheel set is any drive wheel set described above.

Preferably, the swing frame is further provided with a counterweight member, the counterweight member is located on the other end of the swing frame opposite to the slave wire wheel set, and the counterweight member includes two fixing rods, a counterweight adjusting rod disposed between the two fixing rods and a counterweight portion slidable on the counterweight adjusting rod.

As at least one of the master wire wheel set and the slave wire wheel set of the swing-type wire storage frame of the present application is a drive wheel set, several external rotor motors of the drive wheel set are disposed on the same common shaft, the distance between two adjacent external rotor motors can be minimized, and the drive wheel set may be very small in size, which causes the swing-type wire storage frame to be small in size and occupy less space.

The external rotor motors of the drive wheel set of the swing-type wire storage frame of the present application are capable of self-driving, the linear speed of the external rotor motors can be equal to the speed of the tubes on the external rotor motors, and no friction force is produced therebetween any more, thus avoiding that the friction between the tubes and the external rotor motors produce wear-out and cutting of external insulation of the tubes and ensuring the quality of the tubes after wire storage.

As the external rotor motors are capable of self-driving, which is no longer provided by a pulling force of the tubes, the pulling force of the tubes decreases; certainly, it is also possible to adjust the external rotor motors as required to make a ratio between the linear speed of the external rotors and the speed of the cables wound on the external rotors decrease the friction force produced by them. Thus, in the swing-type wire storage frame of the present application, more external rotor motors can be disposed on the drive wheel set, so as to store more tubes and ensure the quality of the stored tubes.

In another aspect, the present application provides a guide wheel frame, including a fixing frame and at least two arms fixed onto the fixing frame, each of which is fixed with a wire wheel set, wherein at least one of the wire wheel sets is any drive wheel set described above.

As at least one of the wire wheel sets of the guide wire frame of the present application is a drive wheel set, several external rotor motors of the drive wheel set are disposed on the same common shaft, the distance between two adjacent external rotor motors can be minimized, and the drive wheel set may be very small in size, which causes the guide wheel frame to be small in size and occupy less space.

The external rotor motors of the drive wheel set of the guide wire frame of the present application are capable of self-driving, the linear speed of the external rotor motors can be equal to the speed of the tubes on the external rotor motors, and no friction force is produced therebetween any more, thus avoiding that the friction between the tubes and the external rotor motors produce wear-out and cutting of external insulation of the tubes and ensuring the quality of the tubes after wire storage.

As the external rotor motors are capable of self-driving, which is no longer provided by a pulling force of the tubes, the pulling force of the tubes decreases; certainly, it is also possible to adjust the external rotor motors as required to make a ratio between the linear speed of the external rotors and the speed of the cables wound on the external rotors decrease the friction force produced by them.

In another aspect, the present application provides a traction mechanism, including a fixing frame and a pair of oppositely disposed traction wheel sets fixed onto the fixing frame, two common shafts of the pair of traction wheel sets being disposed in parallel, and traction wheels in the pair of traction wheel sets being disposed in parallel and correspondingly adjacent to each other, wherein each traction wheel set is any drive wheel set described above, and external rotors of the external rotor motors of the drive wheel set form the traction wheels of the traction wheel sets.

Preferably, there are two pairs of oppositely disposed traction wheel sets, the two pairs of traction wheel sets are disposed in parallel, the fixing frame is two pairs of fixing plates disposed up and down in parallel, common shafts of the two pairs of traction wheel sets are respectively fixed to two ends of the fixing plates, and the traction wheels of one pair of traction wheel sets and the traction wheels of the other pair of traction wheel sets are sleeved with a traction belt.

Preferably, the fixing plates are provided with receiving holes and threaded end holes disposed along a front-back direction of the two pairs of traction wheel sets, the receiving holes receive a shaft fixing block that can move back and forth in the receiving holes, the common shaft is fixed onto the shaft fixing block, the threaded end holes are fixed with a threaded adjusting length member by thread, one end of the threaded adjusting length member is fixed to the shaft fixing block, and the other end of the threaded adjusting length member extends out of the threaded end holes.

Preferably, upper and lower fixing plates on the same side are respectively fixed with a fixing member, wherein one fixing member is provided with a threaded hole, the threaded hole is provided with a threaded adjusting thickness member, one end of the threaded adjusting thickness member extends out of the threaded hole, and the other end of the threaded adjusting thickness member is connected with another fixing member.

Preferably, the upper and lower fixing plates on the same side are respectively fixed with a guide fixing member, wherein one guide fixing member is provided with a guide hole, the guide hole is provided with a guide rod, and the other end of the guide rod is connected with the another guide fixing member.

As several external rotor motors of the traction wheel set of the traction mechanism of the present application are installed on the same common shaft, a smaller distance may be set between adjacent external rotor motors, which causes the traction mechanism to be compact in structure and occupy less space.

In another aspect, the present application provides a multi-path conveying mechanism, including a fixing frame, a pair of oppositely disposed traction wheel sets fixed onto the fixing frame and a plurality of transmission belts, two common shafts of the pair of traction wheel sets being disposed in parallel, wherein a plurality of traction wheels of one traction wheel set and a plurality of traction wheels of the other opposite traction wheel set are respectively sleeved with one of the transmission belts correspondingly, wherein each traction wheel set is any drive wheel set described above, and external rotors of the external rotor motors of the drive wheel set form traction wheels of the traction wheel set.

Preferably, the fixing frame is two pairs of fixing plates disposed in parallel, and common shafts of one pair of the fixing plates are correspondingly fixed to two ends of the fixing plates respectively.

Preferably, the fixing plates are provided with receiving holes and threaded end holes disposed along a front-back direction of one pair of the traction wheel sets, the receiving holes receive a shaft fixing block that can move back and forth in the receiving holes, the common shaft is fixed onto the shaft fixing block, the threaded end holes are fixed with a threaded adjusting length member by thread, one end of the threaded adjusting length member is fixed to the shaft fixing block, and the other end of the threaded adjusting length member extends out of the threaded end holes.

As several external rotor motors of the traction wheel set of the multi-path conveying mechanism of the present application are installed on the same common shaft, a smaller distance may be set between adjacent external rotor motors, which causes the multi-path conveying mechanism to be compact in structure and occupy less space.

The above has elaborated the features and technical advantages of the present application quite extensively so as to better understand the detailed description of the present application. Other features and advantages of the present application will be described below. Persons skilled in the art should understand that disclosed concepts and specific embodiments can be easily used as bases to modify or design other structures to accomplish the same objective of the present application. Persons skilled in the art should also realize that such equivalent structures do not depart from the spirit and scope of the present application. Structures and operating methods of new features considered as characteristics of the present application and further objectives and advantages will be better understood from the following description with reference to the accompanying drawings. However, it should be deeply realized that each feature provided is merely for description and explanation, but not intended to limit the definition of the present application.

DETAILED DESCRIPTION

Embodiments of the present application are described in detail below with reference to the accompanying drawings. It should be emphasized that the following description is merely illustrative instead of limiting the scope of the present application and applications thereof.

Drive Wheel Set

Figure 1:
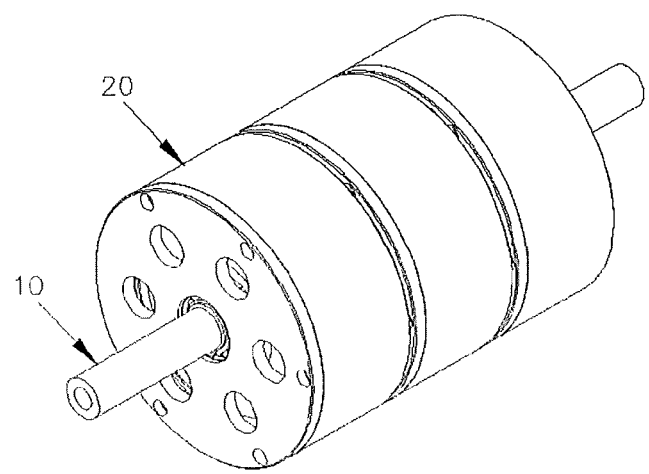
FIG. 1 is a three-dimensional schematic structural diagram of an embodiment of a drive wheel set according to the present application.
Figure 2:
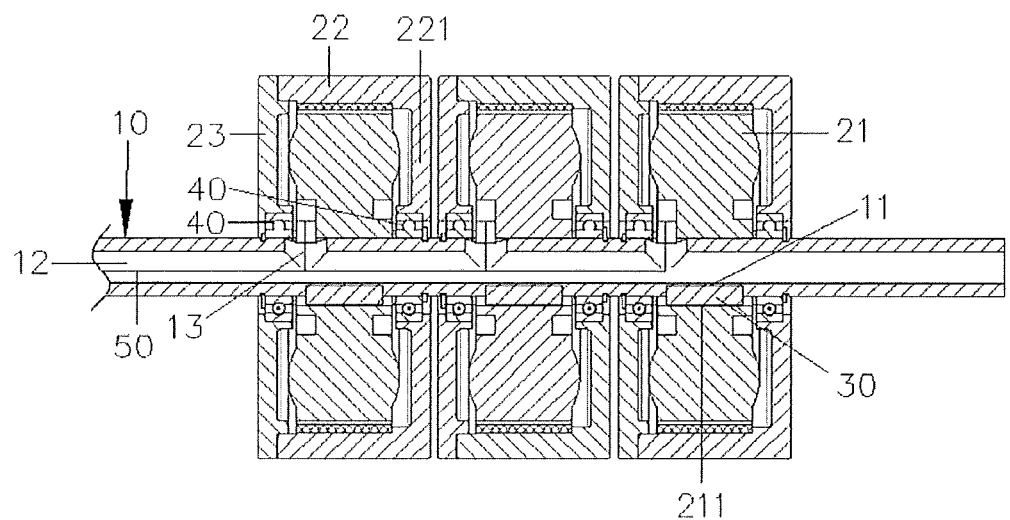
FIG. 2 is a sectional schematic structural diagram of the drive wheel set shown in FIG. 1.

Referring to FIG. 1 and FIG. 2, a drive wheel set according to an embodiment of the present application includes a common shaft 10 and at least two external rotor motors 20 installed on the common shaft 10.

The external rotor motors 20 each include a winding stator 21 and an external rotor 22, and the external rotors 22 of the external rotor motors form drive wheels of the drive wheel set.

The winding stator 21 is fixed onto the common shaft 10, provided thereon with coils.

In one embodiment, the common shaft 10 is provided with a common shaft key slot 11, and the winding stator 21 is provided with a stator key slot 211. The common shaft key slot 11 and the stator key slot 211 are internally fixed with a buckling key 30, so as to fix the winding stator 21 onto the common shaft 10. The winding stator 21 may also be fixed onto the common shaft 10 through direct welding, and actually, any other manners that can fix the winding stator 21 onto the common shaft 10 are feasible.

The external rotor 22 has a magnet, which is pivoted onto the common shaft 10 and disposed outside the winding stator 21. The external rotor 22 is preferably a permanent magnetic external rotor.

In one embodiment, the external rotor 22 has a bracket 221, and the bracket 221 of the external rotor 22 is pivoted onto the common shaft 10 through a bearing 40. The bracket 221 of the external rotor 22 may also be directly pivoted onto the common shaft 10, and any other manners that can pivot the external rotor 22 onto the common shaft 10 directly or indirectly are feasible.

In order to further prevent dust, the external rotor motor 20 is further provided with a cover body 23. The cover body 23 and the external rotor 22 are detachably fixed together, and the cover body 23 is pivoted onto the common shaft 10 through the bearing 40. Certainly, the cover body 23 may also be integrally formed with the external rotor motor 20.

Preferably, the common shaft 10 is provided with a wiring hole 12 extending axially, wherein wire slots 13 are disposed where the common shaft 10 corresponds to the external rotor motors 20 installed thereon, and wire harnesses 50 of each external rotor motor 20 enter into the common shaft through the wire slots 13 and are led out through the wiring hole 12, which can facilitate wiring and save space. Certainly, the wire harnesses of the external rotor motors 20 may also be led out through gaps between the external rotor motors 20.

When the drive wheel set according to the embodiment of the present application works, power is supplied for the winding stator 21 of each external rotor motor 20 respectively through the wire harnesses 50, the coils of the winding stator 21 produce an induced electric field, and the induced electric field repels with a magnetic field produced by the external rotor 22 outside the winding stator 21, which makes the external rotor 22 rotated.

The external rotor motors 20 of the drive wheel set can operate separately, the rotating speed of the external rotor of each external rotor motor 20 can be set differently as required, and a control panel that controls each external rotor motor may be disposed on one side of the drive wheel set.

The external rotor motors 20 of the drive wheel set according to the embodiment of the present application are preferably servo external rotor motors, which can precisely controls the speed of the external rotor 22 of each external rotor motor 20.

To sum up, at least two external rotor motors 20 of the drive wheel set according to the embodiment of the present application are disposed on the same common shaft 10, and the distance between two adjacent external rotor motors 20 can be minimized, which enables the drive wheel set to be small in size, occupy less space, and suitable for a situation where a plurality of motors need to be driven but sufficient space is lacking.

In addition, each external rotor motor may be further provided with a reducer. The reducer is used for adjusting the speed of the drive wheel, to enable the drive wheel to stably operate at a lower speed and output a greater torque during low-speed operation.

Vertical-Type Wire Storage Frame

Figure 3:
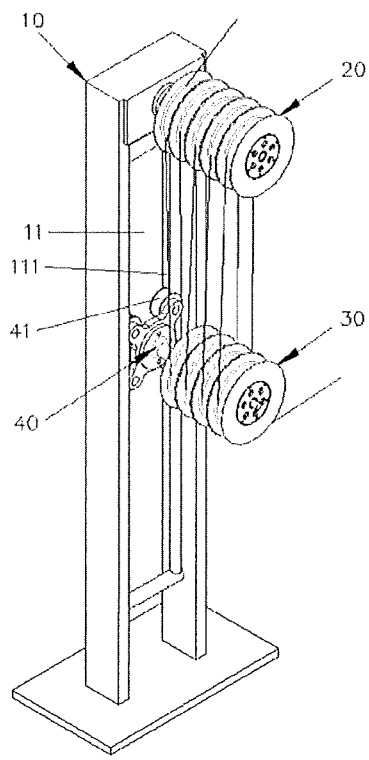
FIG. 3 is a three-dimensional schematic diagram of a vertical-type wire storage frame according to the present application.
Figure 4:
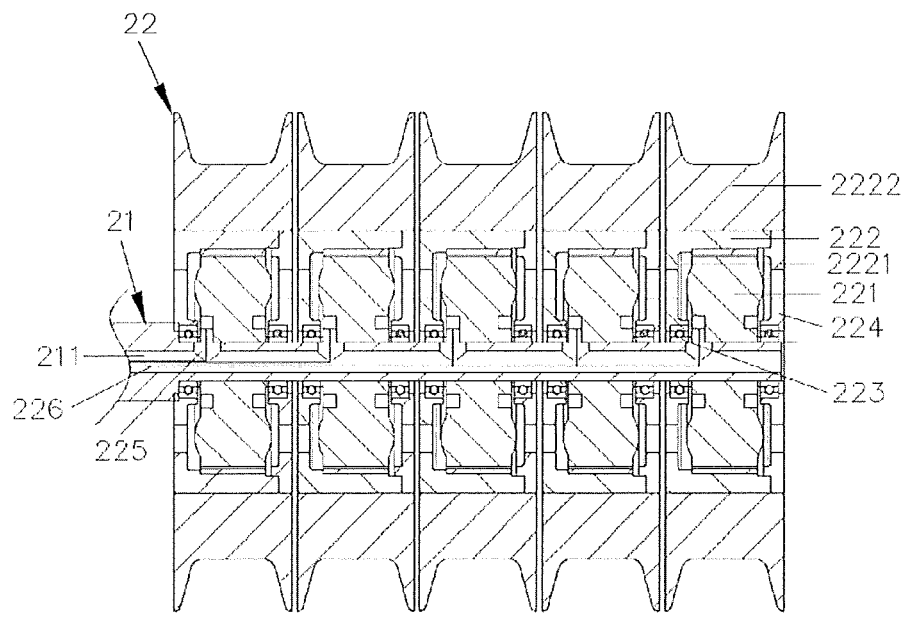
FIG. 4 is an axial sectional diagram of the vertical-type wire storage frame shown in FIG. 3 along a drive wheel set, which is enlarged for ease of viewing.

Referring to FIG. 3 and FIG. 4, a vertical-type wire storage frame according to an embodiment of the present application includes a fixing frame 10 and a master wire wheel set 20 and a slave wire wheel set 30 disposed on the fixing frame 10, the master wire wheel set 20 and the slave wire wheel set 30 are disposed in parallel, and the master wire wheel set 20 is located above the slave wire wheel set 30.

The fixing frame 10 is substantially long-plate-like and disposed vertically, the fixing frame 10 is provided thereon with an open slot 11, and the open slot 11 is provided thereon with a sliding track 111.

In one embodiment, the master wire wheel set 20 is directly fixed above the fixing frame 10 through a master wire wheel shaft thereof; certainly, the master wire wheel set 20 may also be fixed onto the master wire frame 10 in other manners.

The slave wire wheel set 30 is disposed on a sliding member 40, the sliding member 40 has a sliding wheel 41, the sliding member 40 is disposed in the open slot 11, and the sliding wheel 41 of the sliding member 40 moves up and down on the sliding track 111.

Certainly, the sliding member may also be a chain, as long as it can make the slave wire wheel set 30 relatively move relative to the master wire wheel set 20.

Both the master wire wheel set 20 and the slave wire wheel set 30 may be a drive wheel set, or the master wire wheel set 20 or the slave wire wheel set 30 is a drive wheel set, and description is given herein by taking the master wire wheel set 20 as a drive wheel set.

When the master wire wheel set 20 is a drive wheel set, the master wire wheel set 20 has a common shaft 21 and several external rotor motors 22 installed on the common shaft 21, and the common shaft 21 is a shaft of the master wire wheel set.

The external rotor motors 22 each include a winding stator 221 and an external rotor 222.

The winding stator 221 is fixed onto the common shaft 21, provided thereon with coils.

The external rotor 222 has a magnet, which is pivoted onto the common shaft 21 and disposed outside the winding stator 221.

The external rotor 222 is provided thereon with a tube slot 2222.

In one embodiment, the external rotor 222 has a bracket 2221, and the bracket 2221 of the external rotor 222 is pivoted onto the common shaft 21 through a bearing 223. The bracket 221 of the external rotor 222 may also be directly pivoted onto the common shaft 21, and any other manners that can pivot the external rotor 222 onto the common shaft 21 directly or indirectly are feasible.

In order to further prevent dust, the external rotor motor 22 is further provided with a cover body 224. The cover body 224 and the external rotor 222 are detachably fixed together, and the cover body 224 is pivoted onto the common shaft 21 through the bearing 223. Certainly, the cover body 224 may also be integrally formed with the external rotor 222.

The common shaft 21 is provided thereon with a wiring hole 211 extending axially, wherein wire slots 225 are disposed where the common shaft 21 corresponds to each external rotor motor 22 installed thereon, and wire harnesses 226 of the external rotor motor 22 enter into the common shaft 21 through the wire slots 225 and are led out through the wiring hole 211, which can facilitate wiring and save space. Certainly, the wire harnesses of the external rotor motors 22 may also be led out through gaps between the external rotor motors 22.

When the drive wheel set according to the embodiment of the present application works, the coils of the winding stator 221 produce an induced electric field, and the induced electric field repels with a magnetic field produced by the external rotor 222 outside the winding stator 221, which makes the external rotor 222 rotated.

The external rotor motors 22 of the drive wheel set can operate separately, the rotating speed of the external rotor of each external rotor motor 22 can be set differently as required, and a control panel that controls each external rotor motor may be disposed on one side of the drive wheel set.

The external rotor motors 22 of the drive wheel set according to the embodiment of the present application are preferably servo external rotor motors, which can precisely controls the speed of each external rotor motor 22.

Each external rotor motor 22 may be further provided with a reducer. The reducer is used for adjusting the speed of the drive wheel, to enable the drive wheel to stably operate at a lower speed and output a greater torque during low-speed operation.

Several external rotor motors 22 of the drive wheel set are disposed on the same common shaft 21, and the distance between two adjacent external rotor motors 22 can be minimized, which enables the drive wheel set to be small in size, occupy less space, and suitable for a situation where a plurality of motors need to be driven but sufficient space is lacking.

At least one of the master wire wheel set 20 and the slave wire wheel set 30 of the vertical-type wire storage frame according to the embodiment of the present application is a drive wheel set, several external rotor motors 22 of the drive wheel set are disposed on the same common shaft 21, the distance between two adjacent external rotor motors 22 can be minimized, and the drive wheel set may be small in size, which causes the vertical-type wire storage frame to be small in size and occupy less space.

The external rotor motors 22 of the drive wheel set of the vertical-type wire storage frame according to the embodiment of the present application are capable of self-driving, the linear speed of the external rotor motors 22 can be equal to the speed of the tubes on the external rotor motors 22, no friction force is produced therebetween any more, thus avoiding that the friction between the tubes and the external rotor motors 22 produce wear-out and cutting of external insulation of the tubes and ensuring the quality of the tubes after wire storage.

As the external rotor motors 22 are capable of self-driving, which is no longer provided by a pulling force of the tubes, the pulling force of the tubes decreases; certainly, it is also possible to adjust the external rotor motors 22 as required to make a ratio between the linear speed of the external rotors 22 and the speed of the cables wound on the external rotors 22 decrease the friction force produced by them. Thus, in the vertical-type wire storage frame according to the embodiment of the present application, more external rotor motors can be disposed on the drive wheel set, so as to store more tubes and ensure the quality of the stored tubes.

Swing-Type Wire Storage Frame

Figure 5:
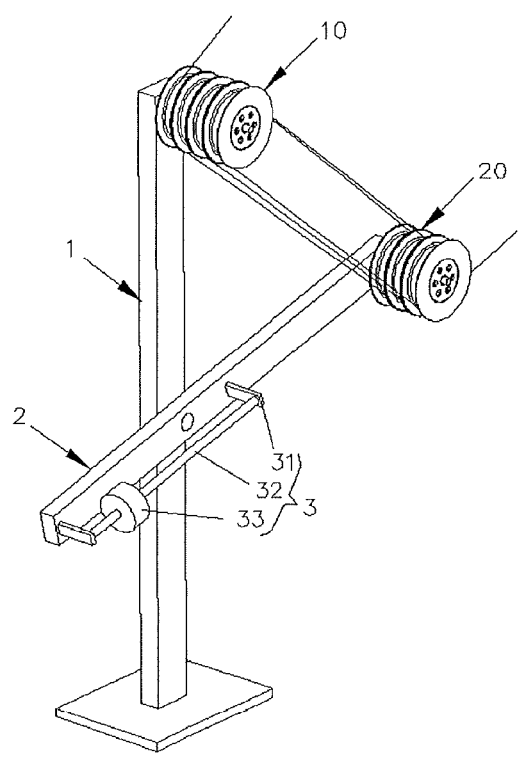
FIG. 5 is a three-dimensional schematic diagram of a swing-type wire storage frame according to the present application.
Figure 6:
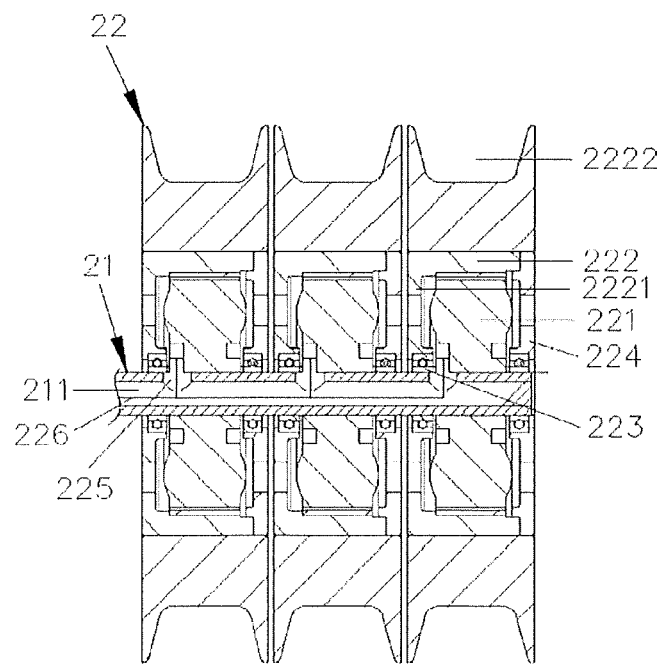
FIG. 6 is an axial sectional diagram of the swing-type wire storage frame shown in FIG. 5 along a drive wheel set, which is enlarged for ease of viewing.

Referring to FIG. 5 and FIG. 6, a swing-type wire storage frame includes a fixing frame 1 and a swing frame 2 pivoted onto the fixing frame 1.

The fixing frame 1 is substantially long-plate-like and disposed vertically. The fixing frame 1 is horizontally provided with a master wire wheel set 10. In one embodiment, the master wire wheel set 10 is directly fixed above the fixing frame 1 through a master wire wheel shaft thereof; certainly, the master wire wheel set 10 may also be fixed onto the master wire frame 1 in other manners.

The swing frame 2 is pivoted onto the fixing frame 1 and pivoted below the master wire wheel set 10. One end of the swing frame 2 is horizontally provided with a slave wire wheel set 20. The swing frame 2 is provided with a counterweight member 3. The counterweight member 3 is located on the other end of the swing frame 2 opposite to the slave wire wheel set 20. The counterweight member 3 includes two fixing rods 31, a counterweight adjusting rod 32 disposed between the two fixing rods 31 and a counterweight portion 33 slidable on the counterweight adjusting rod 32.

Both the master wire wheel set 10 and the slave wire wheel set 20 may be a drive wheel set, or the master wire wheel set 10 or the slave wire wheel set 20 is a drive wheel set, and description is given herein by taking the slave wire wheel set 20 as a drive wheel set.

When the slave wire wheel set 20 is a drive wheel set, the slave wire wheel set 20 has a common shaft 21 and several external rotor motors 22 installed on the common shaft 21, and the common shaft 21 is a shaft of the slave wire wheel set.

The external rotor motors 22 each include a winding stator 221 and an external rotor 222.

The winding stator 221 is fixed onto the common shaft 21, provided thereon with coils.

The external rotor 222 has a magnet, which is pivoted onto the common shaft 21 and disposed outside the winding stator 221.

The external rotor 222 is provided thereon with a tube slot 2222.

In one embodiment, the external rotor 222 has a bracket 2221, and the bracket 2221 of the external rotor 222 is pivoted onto the common shaft 21 through a bearing 223. The bracket 221 of the external rotor 222 may also be directly pivoted onto the common shaft 21, and any other manners that can pivot the external rotor 222 onto the common shaft 21 directly or indirectly are feasible.

In order to further prevent dust, the external rotor motor 22 is further provided with a cover body 224. The cover body 224 and the external rotor 222 are detachably fixed together, and the cover body 224 is pivoted onto the common shaft 21 through the bearing 223. Certainly, the cover body 224 may also be integrally formed with the external rotor 222.

The common shaft 21 is provided thereon with a wiring hole 211 extending axially, wherein wire slots 225 are disposed where the common shaft 21 corresponds to each external rotor motor 22 installed thereon, and wire harnesses of the external rotor motor 22 enter into the common shaft 21 through the wire slots 225 and are led out through the wiring hole 211, which can facilitate wiring and save space. Certainly, the wire harnesses of the external rotor motors 22 may also be led out through gaps between the external rotor motors 22.

When the drive wheel set according to the embodiment of the present application works, the coils of the winding stator 221 produce an induced electric field, and the induced electric field repels with a magnetic field produced by the external rotor 222 outside the winding stator 221, which makes the external rotor 222 rotated.

The external rotor motors 22 of the drive wheel set can operate separately, the rotating speed of the external rotor of each external rotor motor 22 can be set differently as required, and a control panel that controls each external rotor motor may be disposed on one side of the drive wheel set.

The external rotor motors 22 of the drive wheel set according to the embodiment of the present application are preferably servo external rotor motors, which can precisely controls the speed of each external rotor motor 22.

Each external rotor motor 22 may be preferably provided with a reducer. The reducer is used for adjusting the speed of the drive wheel, to enable the drive wheel to stably operate at a lower speed and output a greater torque during low-speed operation.

Several external rotor motors 22 of the drive wheel set are disposed on the same common shaft 21, and the distance between two adjacent external rotor motors 22 can be minimized, which enables the drive wheel set to be small in size, occupy less space, and suitable for a situation where a plurality of motors need to be driven but sufficient space is lacking.

At least one of the master wire wheel set 20 and the slave wire wheel set 30 of the swing-type wire storage frame according to the embodiment of the present application is a drive wheel set, several external rotor motors 22 of the drive wheel set are disposed on the same common shaft 21, the distance between two adjacent external rotor motors 22 can be minimized, and the drive wheel set may be small in size, which causes the vertical-type wire storage frame to be small in size and occupy less space.

The external rotor motors 22 of the drive wheel set of the swing-type wire storage frame according to the embodiment of the present application are capable of self-driving, the linear speed of the external rotor motors 22 can be equal to the speed of the tubes on the external rotor motors 22, and no friction force is produced therebetween any more, thus avoiding that the friction between the tubes and the external rotor motors 22 produce wear-out and cutting of external insulation of the tubes and ensuring the quality of the tubes after wire storage.

As the external rotor motors 22 are capable of self-driving, which is no longer provided by a pulling force of the tubes, the pulling force of the tubes decreases; certainly, it is also possible to adjust the external rotor motors 22 as required to make a ratio between the linear speed of the external rotors 22 and the speed of the cables wound on the external rotors 22 decrease the friction force produced by them. Thus, in the swing-type wire storage frame according to the embodiment of the present application, more external rotor motors can be disposed on the drive wheel set, so as to store more tubes and ensure the quality of the stored tubes.

Guide Wheel Frame

Figure 7:
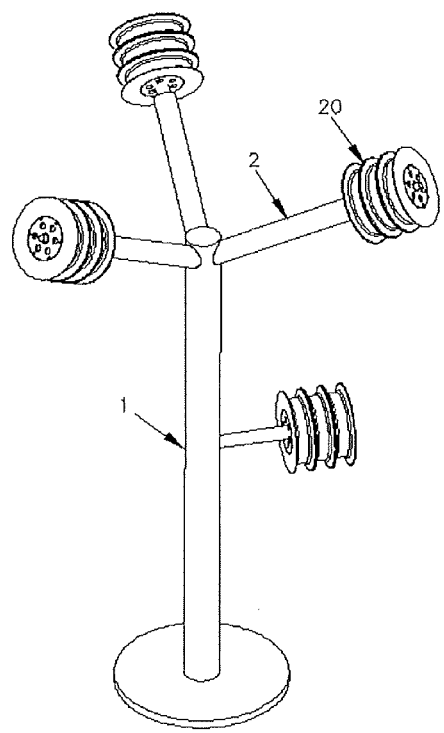
FIG. 7 is a three-dimensional schematic diagram of a guide wheel frame according to the present application.
Figure 8:
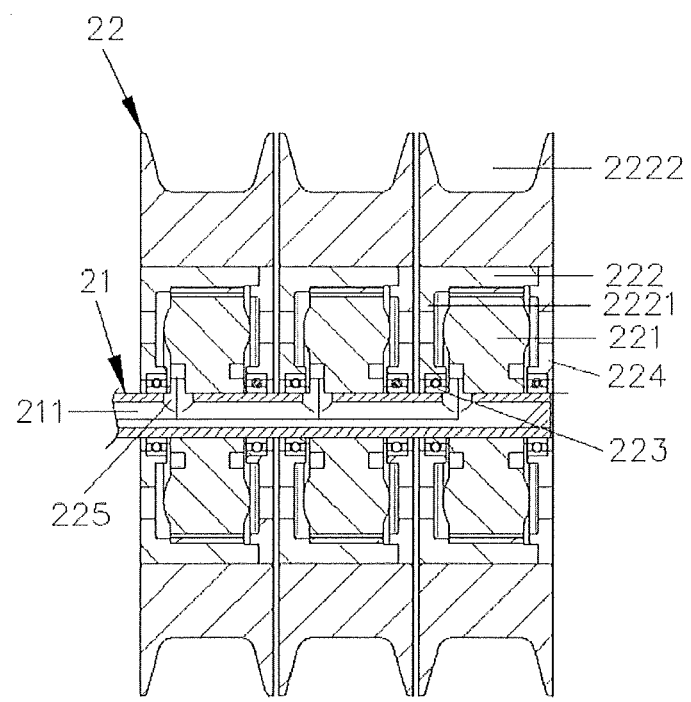
FIG. 8 is an axial sectional diagram of the guide wheel frame shown in FIG. 7 along a drive wheel set, which is enlarged for ease of viewing.

Referring to FIG. 7 and FIG. 8, a guide wheel frame according to the embodiment of the present application includes a fixing frame 1 and several arms 2 fixed onto the fixing frame 1. Each arm 2 is fixed with a wire wheel set 20.

The fixing frame 1 is disposed vertically.

At least one of the several wire wheel sets 20 is a drive wheel set.

When the wire wheel set 20 is a drive wheel set, the slave wire wheel set 20 has a common shaft 21 and several external rotor motors 22 installed on the common shaft 21, and the common shaft 21 is a shaft of the slave wire wheel set.

The external rotor motors 22 each include a winding stator 221 and an external rotor 222.

The winding stator 221 is fixed onto the common shaft 21, provided thereon with coils.

The external rotor 222 has a magnet, which is pivoted onto the common shaft 21 and disposed outside the winding stator 221.

The external rotor 222 is provided thereon with a tube slot 2222.

In one embodiment, the external rotor 222 has a bracket 2221, and the bracket 2221 of the external rotor 222 is pivoted onto the common shaft 21 through a bearing 223. The bracket 221 of the external rotor 222 may also be directly pivoted onto the common shaft 21, and any other manners that can pivot the external rotor 222 onto the common shaft 21 directly or indirectly are feasible.

In order to further prevent dust, the external rotor motor 22 is further provided with a cover body 224. The cover body 224 and the external rotor 222 are detachably fixed together, and the cover body 224 is pivoted onto the common shaft 21 through the bearing 223. Certainly, the cover body 224 may also be integrally formed with the external rotor 222.

The common shaft 21 is provided thereon with a wiring hole 211 extending axially, wherein wire slots 225 are disposed where the common shaft 21 corresponds to each external rotor motor 22 installed thereon, and wire harnesses of the external rotor motor 22 enter into the common shaft 21 through the wire slots 225 and are led out through the wiring hole 211, which can facilitate wiring and save space. Certainly, the wire harnesses of the external rotor motors 22 may also be led out through gaps between the external rotor motors 22.

The external rotor motors 20 of the drive wheel set can operate separately, the rotating speed of the external rotor of each external rotor motor 20 can be set differently as required, and a control panel that controls each external rotor motor may be disposed on one side of the drive wheel set.

The external rotor motors 20 of the drive wheel set according to the embodiment of the present application are preferably servo external rotor motors, which can precisely controls the speed of each external rotor motor 20.

Each external rotor motor 20 may be further provided with a reducer. The reducer is used for adjusting the speed of the drive wheel, to enable the drive wheel to stably operate at a lower speed and output a greater torque during low-speed operation.

Several external rotor motors 22 of the drive wheel set are disposed on the same common shaft 21, and the distance between two adjacent external rotor motors 22 can be minimized, which enables the drive wheel set to be small in size, occupy less space, and suitable for a situation where a plurality of motors need to be driven but sufficient space is lacking.

At least one of the wire wheel sets 20 of the guide wheel frame according to the embodiment of the present application is a drive wheel set, several external rotor motors 22 of the drive wheel set are disposed on the same common shaft 21, the distance between two adjacent external rotor motors 22 can be minimized, and the drive wheel set may be small in size, which causes the guide wheel frame to be small in size and occupy less space.

The external rotor motors 22 of the drive wheel set of the guide wheel frame according to the embodiment of the present application are capable of self-driving, the linear speed of the external rotor motors 22 can be equal to the speed of the tubes on the external rotor motors 22, and no friction force is produced therebetween any more, thus avoiding that the friction between the tubes and the external rotor motors 22 produce wear-out and cutting of external insulation of the tubes and ensuring the quality of the tubes after wire storage.

As the external rotor motors 22 are capable of self-driving, which is no longer provided by a pulling force of the tubes, the pulling force of the tubes decreases; certainly, it is also possible to adjust the external rotor motors 22 as required to make a ratio between the linear speed of the external rotors 22 and the speed of the cables wound on the external rotors 22 decrease the friction force produced by them.

Traction Mechanism

Figure 9:
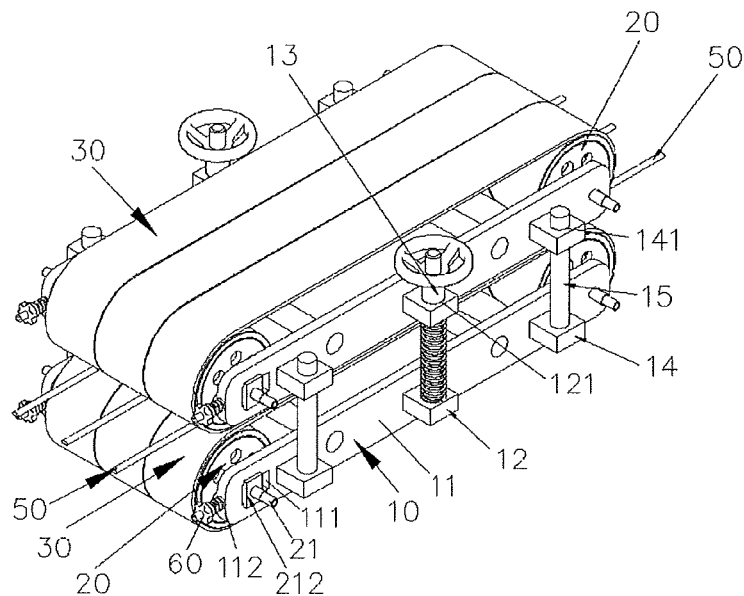
FIG. 9 is a three-dimensional schematic diagram of a traction mechanism according to the present application.
Figure 10:
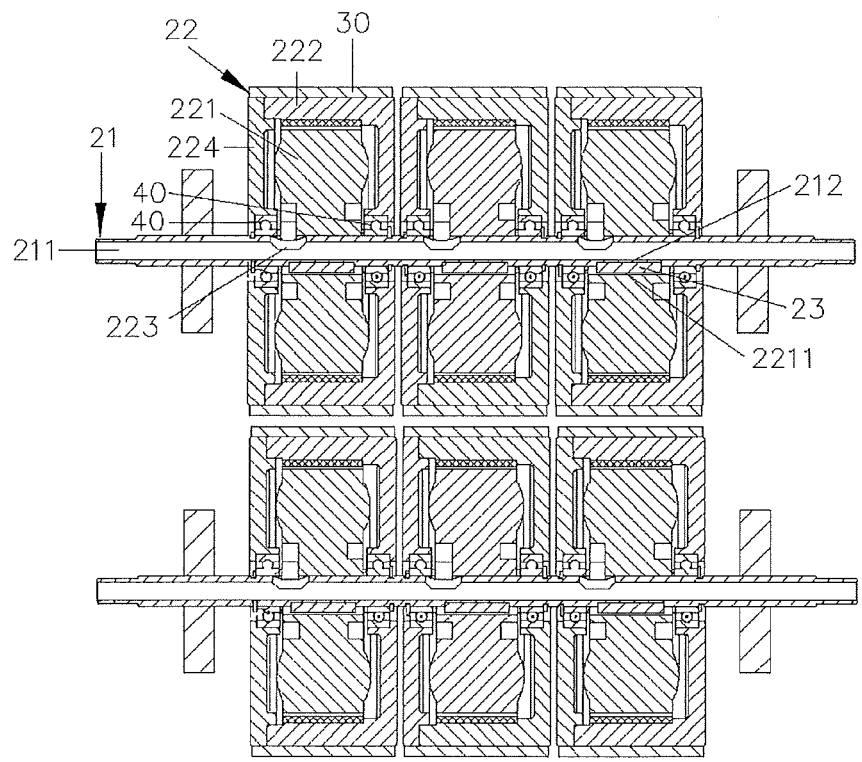
FIG. 10 is a schematic sectional diagram of a pair of traction wheel sets of the traction mechanism shown in FIG. 9, which is enlarged for ease of viewing.

Referring to FIG. 9 and FIG. 10, a traction mechanism according to the embodiment of the present application includes a fixing frame 10 and a pair of oppositely disposed traction wheel sets 20 fixed onto the fixing frame 10.

The fixing frame 10 plays a role of fixing the traction wheel sets 20. In one embodiment, the fixing frame 10 is two pairs of fixing plates 11 disposed up and down in parallel.

In one embodiment, there are two pairs of oppositely disposed traction wheel sets 20. Each traction wheel set 20 includes a common shaft 21 and several external rotor motors 22 installed on the common shaft 21. The external rotor motors 22 each include a winding stator 221 and an external rotor 222.

The winding stator 221 is fixed onto the common shaft 21. In one embodiment, the common shaft 21 is provided with a common shaft key slot 212, and the winding stator 221 is provided with a stator key slot 2211. The common shaft key slot 212 and the stator key slot 2211 are internally fixed with a buckling key 23, so as to fix the winding stator 221 onto the common shaft 21. The winding stator 221 may also be fixed onto the common shaft 21 through direct welding, and actually, any other manners that can fix the winding stator 221 onto the common shaft 21 are feasible.

The external rotor 222 is disposed outside the winding stator 221 and pivoted onto the common shaft 21. The external rotor 222 is preferably pivoted onto the common shaft 21 through a bearing 40. Two common shafts 21 of each pair of the traction wheel sets 20 are disposed in parallel. The external rotors 222 of the external rotor motors 22 form traction wheels of the traction wheel sets 20. The traction wheels of each pair of traction wheel sets 20 are disposed in parallel and correspondingly adjacent to each other.

The two pairs of traction wheel sets 20 are disposed in parallel, common shafts 21 of the two pairs of traction wheel sets 20 are respectively fixed to two ends of the fixing plates 11, and the traction wheels of one pair of traction wheel sets 20 and the traction wheels of the other pair of traction wheel sets 20 are sleeved with a traction belt 30.

Preferably, the common shaft 21 is provided with a wiring hole 211 extending axially, wherein wire slots 223 are disposed where the common shaft 21 corresponds to the external rotor motors 22 installed thereon, and wire harnesses (not shown) of the external rotor motors 22 enter into the common shaft 21 through the wire slots 223 and are led out through the wiring hole 211. Certainly, the wire harnesses of the external rotor motors 22 may also be led out through gaps between the external rotor motors 22.

Preferably, the external rotor motor 22 is further provided with a cover body 224. The cover body 224 and the external rotor 222 are detachably fixed together, and the cover body 224 is pivoted onto the common shaft 21 through the bearing 40.

When the traction mechanism according to the embodiment of the present application pulls tube wires, a plurality of tube wires 50 are correspondingly pressed between two pairs of traction belts 30 respectively, the external rotor motors 22 of two pairs of traction wheel sets 20 rotate to drive the traction belts 30 to circularly rotate, and the tube wires 50 sandwiched between two traction belts 30 are pulled through rotation of the traction belts 30.

The external rotor motors 22 of the traction wheel set can operate separately, the rotating speed of the external rotor of each external rotor motor 22 can be set differently as required, and a control panel that controls each external rotor motor may be disposed on one side of the drive wheel set.

Several external rotor motors 22 of the traction wheel set 20 of the traction mechanism according to the embodiment of the present application are installed on the same common shaft 21, and a smaller distance may be set between adjacent external rotor motors 22, which causes the traction mechanism to be compact in structure and occupy less space.

Preferably, the fixing plates 11 are provided with receiving holes 111 and threaded end holes 112 disposed along a front-back direction of the two pairs of traction wheel sets. The receiving holes 111 receive a shaft fixing block 212 that can move back and forth in the receiving holes. The common shaft 21 is fixed onto the shaft fixing block 212. The threaded end holes 112 are fixed with a threaded adjusting length member 60 by thread. One end of the threaded adjusting length member 60 is fixed to the shaft fixing block 212, and the other end of the threaded adjusting length member 60 extends out of the threaded end holes 112. Adjustment of the threaded adjusting length member 60 can adjust the distance between the two pairs of traction wheel sets 20, thus adjusting the tightness of the traction belt 30.

Preferably, upper and lower fixing plates 11 on the same side are respectively fixed with a fixing member 12, wherein one fixing member 12 is provided with a threaded hole 121, and the threaded hole 121 is provided with a threaded adjusting thickness member 13. One end of the threaded adjusting thickness member 13 extends out of the threaded hole 121, and the other end of the threaded adjusting thickness member 13 is connected with another fixing member 12. Adjustment of the threaded adjusting thickness member 13 can adjust the distance between upper and lower traction wheels of each pair of traction wheel sets 20, to adapt to tube wires with different thicknesses and specifications.

Preferably, the upper and lower fixing plates 11 on the same side are respectively fixed with a guide fixing member 14, wherein one guide fixing member 14 is provided with a guide hole 141, the guide hole 141 is provided with a guide rod 15, and the other end of the guide rod 15 is connected with the another guide fixing member 14, which can improve stability of the two pairs of traction wheel sets 20.

It should be pointed out that the above are preferred embodiments of the embodiments of the present application, the traction mechanism may also be merely one pair of traction wheel sets 20, and when working, tube wires are sandwiched between upper and lower traction wheels of the two traction wheel sets 20 for traction.

To sum up, several external rotor motors 22 of the traction wheel set 20 of the traction mechanism according to the embodiment of the present application are installed on the same common shaft 21, and a smaller distance may be set between adjacent external rotor motors 22, which causes the traction mechanism to be compact in structure and occupy less space.

Multi-Path Conveying Mechanism

Figure 11:
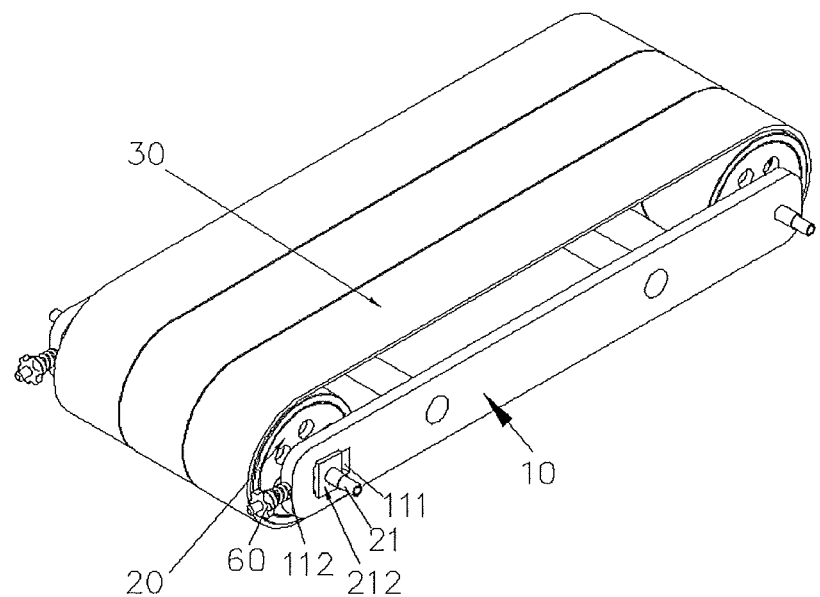
FIG. 11 is a three-dimensional schematic diagram of a multi-path conveying mechanism according to the present application.
Figure 12:
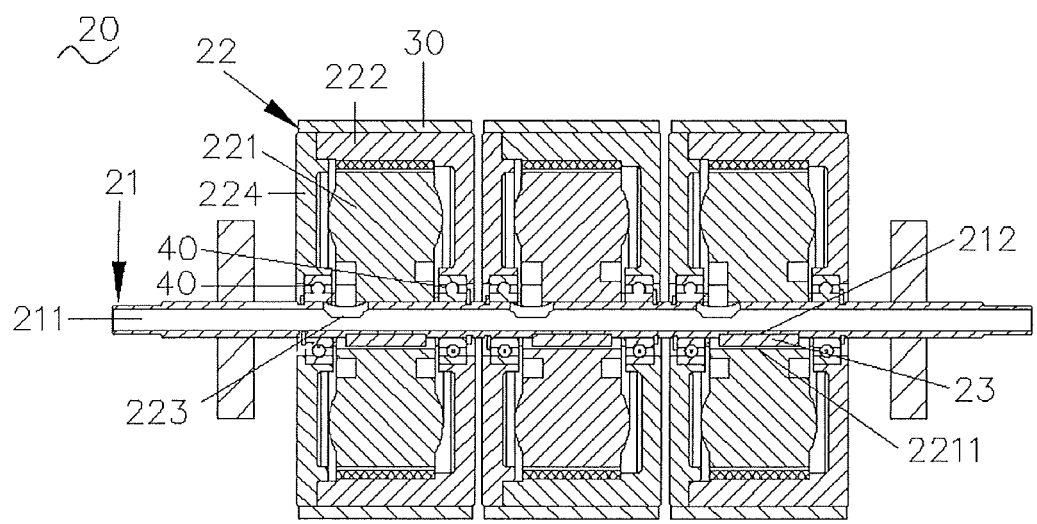
FIG. 12 is a schematic sectional diagram of a pair of traction wheel sets of the multi-path conveying mechanism shown in FIG. 11, which is enlarged for ease of viewing.

Referring to FIG. 11 and FIG. 12, a multi-path conveying mechanism according to the embodiment of the present application includes a fixing frame 10 and a pair of oppositely disposed traction wheel sets 20 fixed onto the fixing frame 10 and a plurality of transmission belts 30.

The fixing frame 10 plays a role of fixing the traction wheel sets 20. In one embodiment, the fixing frame 10 is two pairs of fixing plates 11 disposed up and down in parallel.

In one embodiment, each traction wheel set 20 includes a common shaft 21 and several external rotor motors 22 installed on the common shaft 21. The external rotor motors 22 each include a winding stator 221 and an external rotor 222.

The winding stator 221 is fixed onto the common shaft 21. In one embodiment, the common shaft 21 is provided with a common shaft key slot 212, and the winding stator 221 is provided with a stator key slot 2211. The common shaft key slot 212 and the stator key slot 2211 are internally fixed with a buckling key 23, so as to fix the winding stator 221 onto the common shaft 21. The winding stator 221 may also be fixed onto the common shaft 21 through direct welding, and actually, any other manners that can fix the winding stator 221 onto the common shaft 21 are feasible.

The external rotor 222 is disposed outside the winding stator 221 and pivoted onto the common shaft 21. The external rotor 222 is preferably pivoted onto the common shaft 21 through a bearing 40. Two common shafts 21 of each pair of the traction wheel sets 20 are disposed in parallel. The external rotors 222 of the external rotor motors 22 form traction wheels of the traction wheel sets 20.

The two pairs of traction wheel sets 20 are disposed in parallel, common shafts 21 of the two pairs of traction wheel sets 20 are respectively fixed to two ends of the fixing plates 11, and the traction wheels of one pair of traction wheel sets 20 and the traction wheels of the other pair of traction wheel sets 20 are sleeved with a transmission belt 30.

Preferably, the common shaft 21 is provided with a wiring hole 211 extending axially, wherein wire slots 223 are disposed where the common shaft 21 corresponds to the external rotor motors 22 installed thereon, and wire harnesses (not shown) of the external rotor motors 22 enter into the common shaft 21 through the wire slots 223 and are led out through the wiring hole 211. Certainly, the wire harnesses of the external rotor motors 22 may also be led out through gaps between the external rotor motors 22.

Preferably, the external rotor motor 22 is further provided with a cover body 224. The cover body 224 and the external rotor 222 are detachably fixed together, and the cover body 224 is pivoted onto the common shaft 21 through the bearing 40.

When the multi-path conveying mechanism according to the embodiment of the present application pulls products, a plurality of products 50 are correspondingly placed on transmission belts 30 respectively, the external rotor motors 22 of two pairs of traction wheel sets 20 rotate to drive the transmission belts 30 to circularly rotate, and the products 50 placed on the transmission belts 30 are transmitted through rotation of the transmission belts 30.

The external rotor motors 22 of the traction wheel set 20 can operate separately, the rotating speed of the external rotor of each external rotor motor 22 can be set differently as required, and a control panel that controls each external rotor motor may be disposed on one side of the drive wheel set.

Several external rotor motors 22 of the traction wheel set 20 of the multi-path conveying mechanism according to the embodiment of the present application are installed on the same common shaft 21, and a smaller distance may be set between adjacent external rotor motors 22, which causes the traction mechanism to be compact in structure and occupy less space.

Preferably, the fixing plates 11 are provided with receiving holes 111 and threaded end holes 112 disposed along a front-back direction of the two pairs of traction wheel sets. The receiving holes 111 receive a shaft fixing block 212 that can move back and forth in the receiving holes. The common shaft 21 is fixed onto the shaft fixing block 212. The threaded end holes 112 are fixed with a threaded adjusting length member 60 by thread. One end of the threaded adjusting length member 60 is fixed to the shaft fixing block 212, and the other end of the threaded adjusting length member 60 extends out of the threaded end holes 112. Adjustment of the threaded adjusting length member 60 can adjust the distance between the two pairs of traction wheel sets 20, thus adjusting the tightness of the transmission belt 30.

To sum up, several external rotor motors 22 of the traction wheel set 20 of the multi-path conveying mechanism according to the embodiment of the present application are installed on the same common shaft 21, and a smaller distance may be set between adjacent external rotor motors 22, which causes the traction mechanism to be compact in structure and occupy less space.

Although the present application is described above in further detail through specific embodiments, the present application is not limited to the specific embodiments. Although the present application and advantages thereof have been described in detail, it should be understood by persons of ordinary skill in the art that various changes, replacements and modifications made without departing from the spirit and scope of the present application shall fall within the protection scope of the present application. In addition, the application scope of the present application is not limited to specific embodiments of the processes, machines, manufacturing, material composition, manners, methods and steps described in the description. From the disclosure of the present application, it is easy for persons skilled in the art to use processes, machines, manufacturing, material composition, manners, methods or steps existing or to be developed in future which implement the same function of the corresponding embodiment described herein or achieves the same result. Therefore, the appended claims are intended to include the processes, machines, manufacturing, material composition, manners, methods or steps.

What is claimed is:

1. A drive wheel set, comprising:
   a common shaft; and
   at least two external rotor motors installed on the common shaft, external rotors of the external rotor motors forming drive wheels of the drive wheel set,
   wherein each of the external rotor motors comprises a winding stator and an external rotor,
   the winding stator is fixed onto the common shaft,
   the external rotor is disposed outside the winding stator and pivoted onto the common shaft, and
   the winding stators of the external rotor motors and the common shaft are respectively provided with key slots and are fixed into the key slots through buckling keys to fix the winding stators onto the common shaft.

2. The drive wheel set according to claim 1, wherein the external rotors are permanent magnetic external rotors.

3. The drive wheel set according to claim 1, wherein the external rotors of the external rotor motors are pivoted onto the common shaft through bearings.

4. The drive wheel set according to claim 1, wherein the common shaft is provided with a wiring hole extending axially,
   wire slots are disposed on portions of the common shaft corresponding to the external rotor motors installed thereon, and
   wire harnesses of the drive wheels enter into the common shaft through the wire slots and are led out through the wiring hole.

5. The drive wheel set according to claim 1, wherein the external rotor motor is further provided with a cover body,
   the cover body and the external rotor are detachably fixed together, and
   the cover body is pivoted onto the common shaft through a bearing.

6. The drive wheel set according to claim 1, wherein the external rotor motors are squirrel-cage asynchronous motors.

7. A vertical-type wire storage frame, comprising:
   a fixing frame;
   a master wire wheel set; and
   a slave wire wheel set disposed on the fixing frame, the master wire wheel set and the slave wire wheel set being disposed in parallel,
   wherein at least one of the master wire wheel set and the slave wire wheel set is the drive wheel set according to claim 1.

8. A swing-type wire storage frame, comprising:
   a fixing frame; and
   a swing frame, the fixing frame being horizontally provided with a master wire wheel set, the swing frame being pivoted onto the fixing frame and pivoted below the master wire wheel set, and one end of the swing frame being horizontally provided with a slave wire wheel set,
   wherein at least one of the master wire wheel set and the slave wire wheel set is the drive wheel set according to claim 1.

9. The swing-type wire storage frame according to claim 8, wherein the swing frame is further provided with a counterweight member,
   the counterweight member is located on the other end of the swing frame opposite to the slave wire wheel set, and the counterweight member comprises two fixing rods, a counterweight adjusting rod disposed between the two fixing rods and a counterweight portion slidable on the counterweight adjusting rod.

10. A guide wheel frame, comprising:
a fixing frame; and
at least two arms fixed onto the fixing frame, each of which is fixed with a wire wheel set,
wherein at least one of the wire wheel sets is the drive wheel set according to claim 1.

11. A traction mechanism, comprising:
a fixing frame; and
a pair of oppositely disposed traction wheel sets fixed onto the fixing frame, two common shafts of the pair of traction wheel sets being disposed in parallel, and traction wheels in the pair of traction wheel sets being disposed in parallel and correspondingly adjacent to each other,
wherein each traction wheel set is the drive wheel set according to claim 1, and
external rotors of the external rotor motors of the drive wheel set form the traction wheels of the traction wheel sets.

12. A traction mechanism, comprising:
a fixing frame; and
a pair of oppositely disposed traction wheel sets fixed onto the fixing frame, two common shafts of the pair of traction wheel sets being disposed in parallel, and traction wheels in the pair of traction wheel sets being disposed in parallel and correspondingly adjacent to each other,
wherein each traction wheel set is a drive wheel set that comprises:
   a common shaft; and
   at least two external rotor motors installed on the common shaft, external rotors of the external rotor motors forming drive wheels of the drive wheel set,
   wherein each of the external rotor motors comprises a winding stator and an external rotor,
   the winding stator is fixed onto the common shaft, and
   the external rotor is disposed outside the winding stator and pivoted onto the common shaft,
external rotors of the external rotor motors of the drive wheel set form the traction wheels of the traction wheel sets,
there are two pairs of oppositely disposed traction wheel sets,
the two pairs of traction wheel sets are disposed in parallel,
the fixing frame is two pairs of fixing plates disposed up and down in parallel,
common shafts of the two pairs of traction wheel sets are respectively fixed to two ends of the fixing plates, and
the traction wheels of one pair of traction wheel sets and the traction wheels of the other pair of traction wheel sets are sleeved with a traction belt.

13. The traction mechanism according to claim 12, wherein the fixing plates are provided with receiving holes and threaded end holes disposed along a front-back direction of the two pairs of traction wheel sets,
the receiving holes receive a shaft fixing block that can move back and forth in the receiving holes, the common shaft is fixed onto the shaft fixing block,
the threaded end holes are fixed with a threaded adjusting length member by thread,
one end of the threaded adjusting length member is fixed to the shaft fixing block, and
the other end of the threaded adjusting length member extends out of the threaded end holes.

14. The traction mechanism according to claim 12, wherein upper and lower fixing plates on the same side are respectively fixed with a fixing member,
one fixing member is provided with a threaded hole,
the threaded hole is provided with a threaded adjusting thickness member,
one end of the threaded adjusting thickness member extends out of the threaded hole, and
the other end of the threaded adjusting thickness member is connected with another fixing member.

15. The traction mechanism according to claim 14, wherein the upper and lower fixing plates on the same side are respectively fixed with a guide fixing member,
one guide fixing member is provided with a guide hole,
the guide hole is provided with a guide rod, and
the other end of the guide rod is connected with the another guide fixing member.

16. A multi-path conveying mechanism, comprising:
a fixing frame;
a pair of oppositely disposed traction wheel sets fixed onto the fixing frame; and
a plurality of transmission belts, two common shafts of the pair of traction wheel sets being disposed in parallel,
wherein a plurality of traction wheels of one traction wheel set and a plurality of traction wheels of the other opposite traction wheel set are respectively sleeved with one of the transmission belts correspondingly,
each traction wheel set is the drive wheel that comprises:
   a common shaft; and
   at least two external rotor motors installed on the common shaft, external rotors of the external rotor motors forming drive wheels of the drive wheel set,
   wherein each of the external rotor motors comprises a winding stator and an external rotor,
   the winding stator is fixed onto the common shaft,
   the external rotor is disposed outside the winding stator and pivoted onto the common shaft, and
external rotors of the external rotor motors of the drive wheel set form traction wheels of the traction wheel set.

17. The multi-path conveying mechanism according to claim 16, wherein the fixing frame is two pairs of fixing plates disposed in parallel, and
common shafts of one pair of the fixing plates are correspondingly fixed to two ends of the fixing plates respectively.

18. The multi-path conveying mechanism according to claim 17, wherein the fixing plates are provided with receiving holes and threaded end holes disposed along a front-back direction of one pair of the traction wheel sets,
the receiving holes receive a shaft fixing block that can move back and forth in the receiving holes,
the common shaft is fixed onto the shaft fixing block,
the threaded end holes are fixed with a threaded adjusting length member by thread,
one end of the threaded adjusting length member is fixed to the shaft fixing block, and
the other end of the threaded adjusting length member extends out of the threaded end holes.

* * * * *